United States Patent
Merrifield

(10) Patent No.: US 7,716,897 B2
(45) Date of Patent: May 18, 2010

(54) DEPLOYABLE RECTANGULAR TRUSS BEAM WITH ORTHOGONALLY-HINGED FOLDING DIAGONALS

(76) Inventor: Donald V. Merrifield, 703 St. Francis Ave., Smyrna, TN (US) 37167

(*) Notice: Subject to any disclaimer, the term of this patent is extended or adjusted under 35 U.S.C. 154(b) by 1219 days.

(21) Appl. No.: 11/273,238

(22) Filed: Nov. 14, 2005

(65) Prior Publication Data

US 2006/0107611 A1    May 25, 2006

Related U.S. Application Data

(63) Continuation-in-part of application No. 10/188,898, filed on Jul. 3, 2002, now Pat. No. 7,028,442.

(60) Provisional application No. 60/302,997, filed on Jul. 3, 2001.

(51) Int. Cl.
    *E04G 1/18*      (2006.01)
    *E04G 1/22*      (2006.01)

(52) U.S. Cl. ............ 52/651.1; 52/646; 52/645; 52/632; 52/118

(58) Field of Classification Search ............ 52/117, 52/118, 651.1, 646, 645, 121, 632, 109; 182/141
See application file for complete search history.

(56) References Cited

U.S. PATENT DOCUMENTS

| | | | | |
|---|---|---|---|---|
| 4,475,323 A | * | 10/1984 | Schwartzberg et al. | 52/111 |
| 4,655,022 A | * | 4/1987 | Natori | 52/646 |
| 4,829,739 A | * | 5/1989 | Coppa | 52/745.2 |
| 5,102,266 A | * | 4/1992 | Carruba | 405/227 |
| 5,125,206 A | * | 6/1992 | Motohashi et al. | 52/646 |
| 5,228,258 A | * | 7/1993 | Onoda et al. | 52/646 |
| 5,267,424 A | * | 12/1993 | Douglas | 52/646 |
| 5,701,713 A | * | 12/1997 | Silver | 52/645 |
| 5,757,335 A | * | 5/1998 | Kaneff et al. | 343/882 |
| 6,028,570 A | * | 2/2000 | Gilger et al. | 343/915 |

* cited by examiner

*Primary Examiner*—Phi Dieu Tran A
(74) *Attorney, Agent, or Firm*—Wayne Edward Ramage; Baker Donelson

(57) ABSTRACT

A deployable rectangular truss with folding or removable chordal members and diagonals and orthogonal hinge joints for continuous and synchronous retraction and extension. The truss is rectangular in cross section, with four common chords on the corners. Two opposing sides of the truss have diagonals that meet at side joints. One or more end frames may be used to close off or mount one or more ends of the deployable truss. A plurality of telescoping transverse struts may extend between major joints on one side of the truss.

18 Claims, 17 Drawing Sheets

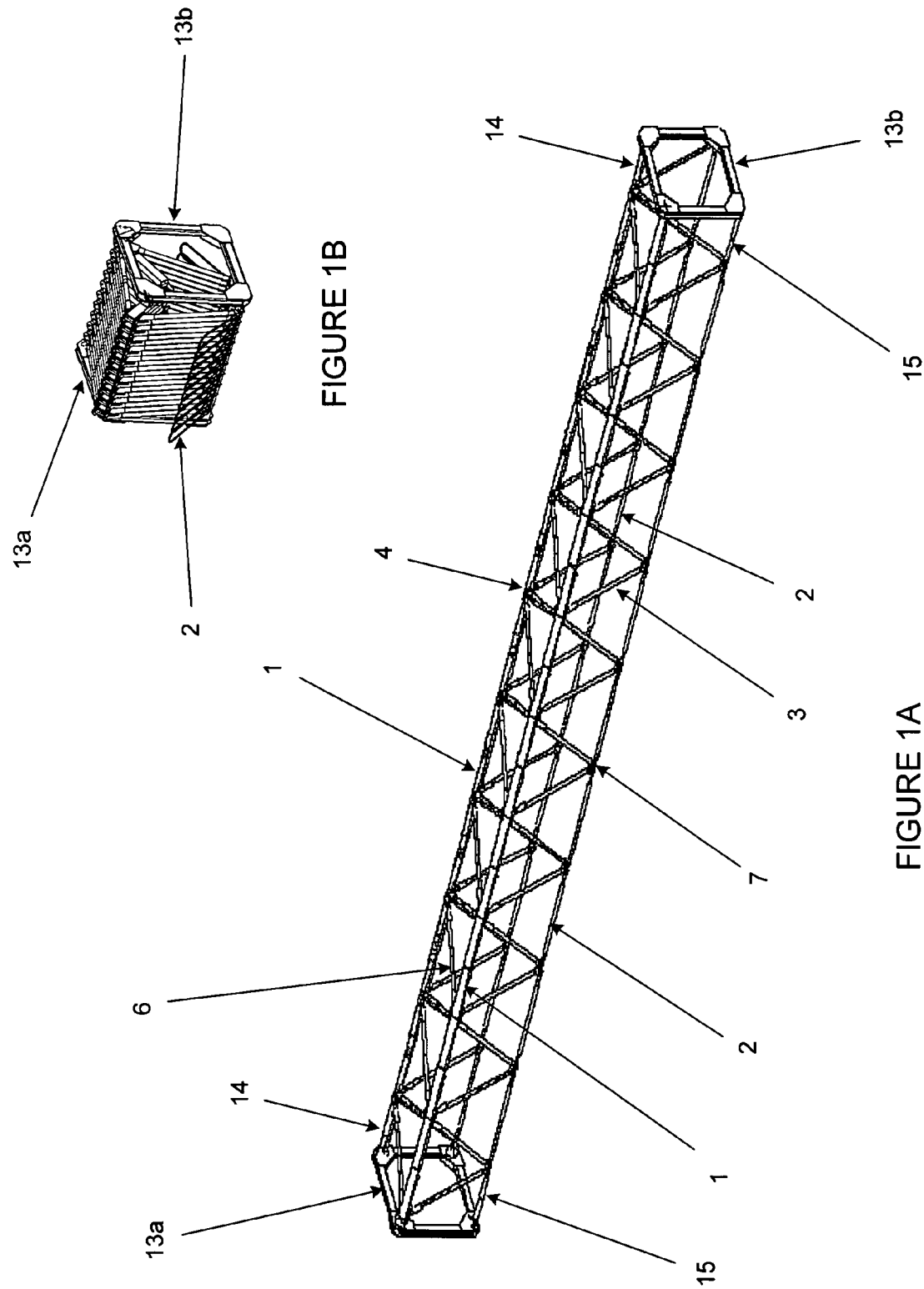

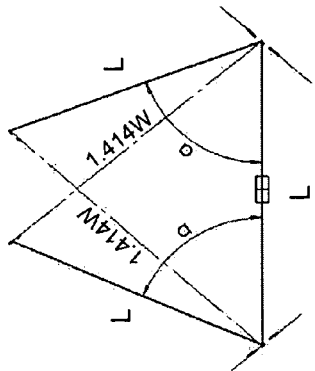
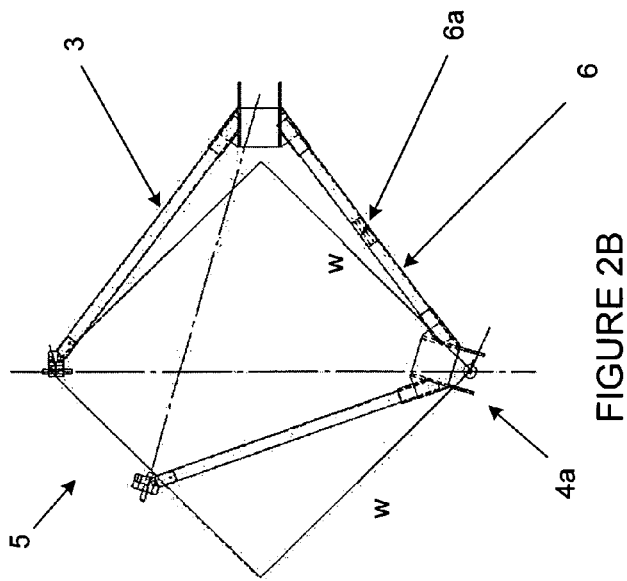
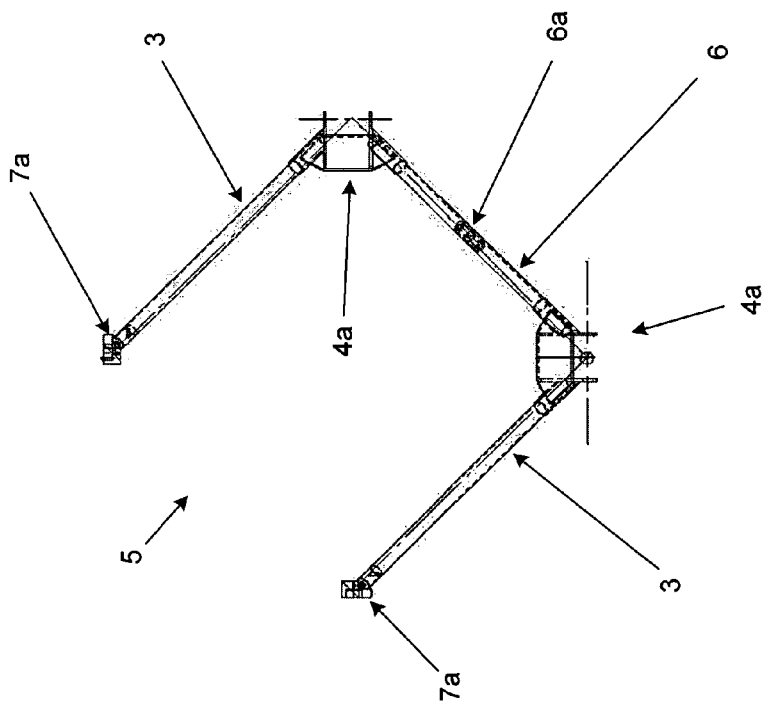

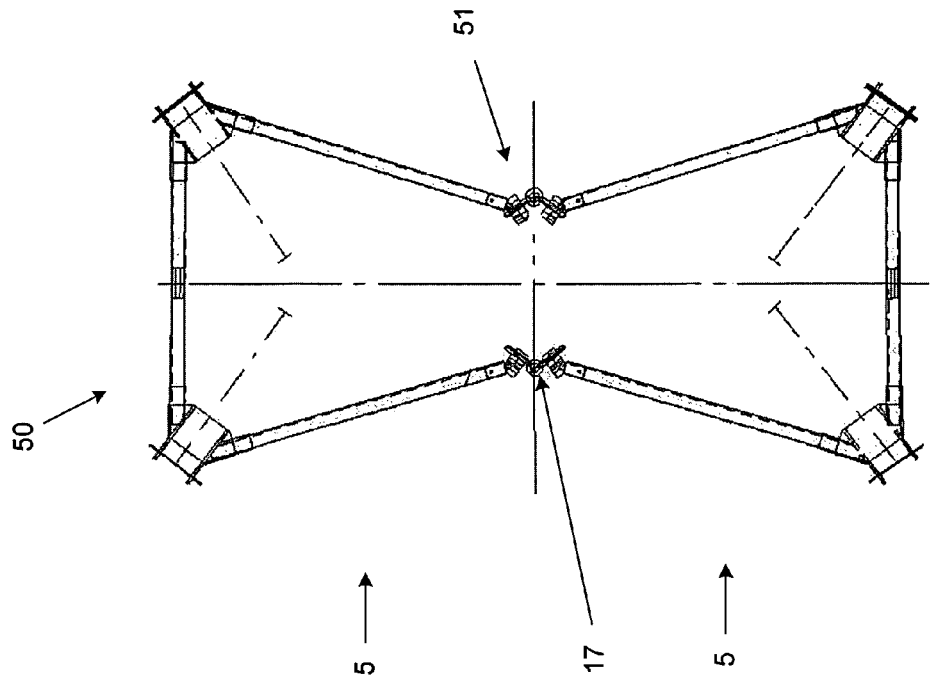
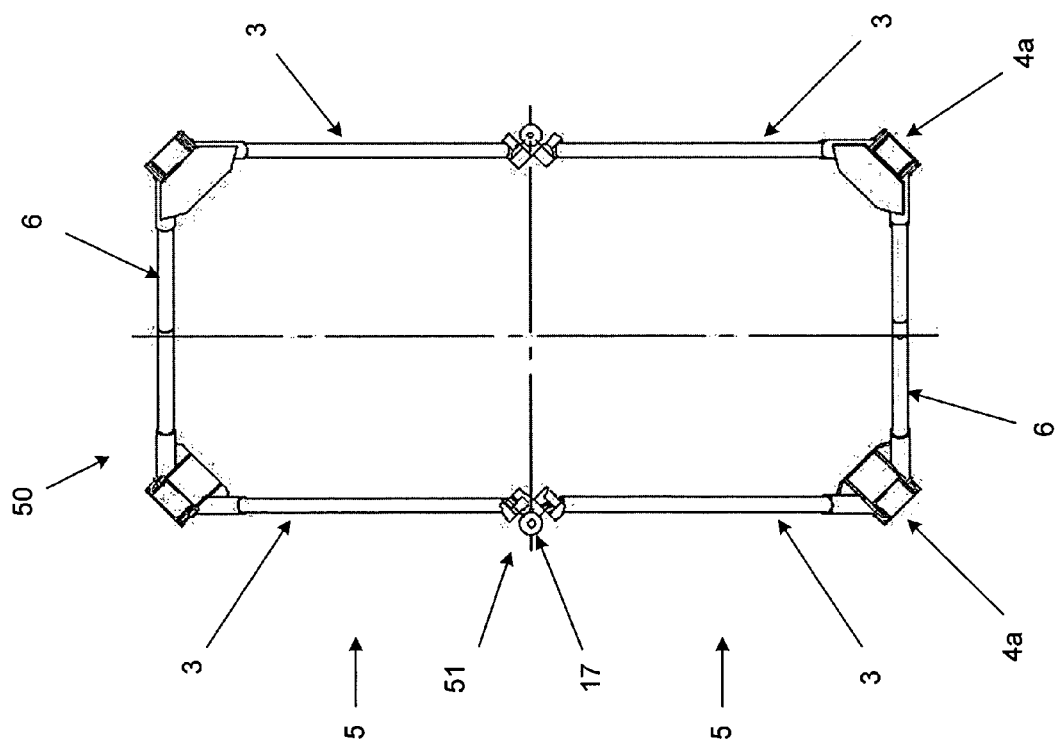
FIGURE 7B
FIGURE 7A

DEPLOYABLE RECTANGULAR TRUSS BEAM WITH ORTHOGONALLY-HINGED FOLDING DIAGONALS

This application is a continuation-in-part of U.S. patent application Ser. No. 10/188,898, filed Jul. 3, 2002, now U.S. Pat. No. 7,028,442 by Donald Merrifield, which claims priority to Provisional Patent Application No. 60/302,997, filed Jul. 3, 2001, and is entitled in whole or in part to those filing dates for priority. The specifications of U.S. patent application Ser. No. 10/188,898 and Provisional Patent Application No. 60/302,997 are incorporated herein in their entirety by reference.

BACKGROUND OF THE INVENTION

This invention relates generally to deployable truss beams, and more particularly to the apparatus and manner in which a three-dimensional, tetrahedron-based truss of square or rectangular section can be expanded and retracted in a continuous, stable, synchronous fashion in a variety of combinations and configurations to form a load-carrying beam or mast. Four longitudinal truss chords are formed by primary and secondary chord members, which can be formed by hinged, rigid, or flexible members. Chord members are connected by framesets comprised of truss diagonal members. Continuous, stable and synchronous motion while extending and retracting the truss is achieved by the use of uniquely incorporated orthogonal hinge joint fittings connecting the framesets and the chord members. The orthogonal hinge joint axes become orthogonal to each other at full extension of the truss and remain parallel at all times.

There have been many attempts to design, for various operating environments, a practical compact folding or flexing truss structure which can transition easily between the retracted and the useful extended state while exhibiting favorable characteristics of size/volume ratio, kinematic stability, simplicity and reliability, structural efficiency and weight, complexity, auxiliary mechanism requirements, manufacturing costs, speed of operation, and operating cost. Relatively few designs have appeared in the marketplace. Notable high-profile, and high-flying, examples are deployable trusses used in space missions such as for solar array deployment on NASA's International Space Station. Undesirable features of existing deployable trusses include complexity, inability to move in a coordinated and synchronous manner, requirements for a dedicated deployer and auxiliary mechanisms, and high cost.

Thus, what is needed is a deployable truss that achieves synchronous coordinated motion of all members while extending or retracting, is stable and self-forming and requires no dedicated auxiliary mechanisms and structures, and yet remains low in weight, complexity, and cost.

SUMMARY OF THE INVENTION

This invention relates to the apparatus and manner in which a three-dimensional, tetrahedron-based truss of square or rectangular section can be expanded and retracted in a stable, synchronous fashion in a variety of combinations and configurations to form a load-carrying beam or mast. The basic single truss comprises four longitudinal truss chords which are formed by primary and secondary chord members. These chord members can be either compression or tension members. Compression chord members may be hinged so they fold during retraction of the truss, or rigid members that are affixed to the truss after extension. Tension chord members may be flexible or hinged. Chord members are connected by framesets comprised of truss diagonal members. Continuous, stable and synchronous motion while extending and retracting the truss is achieved by the use of uniquely incorporated orthogonal hinge joint fittings connecting the framesets and the chord members. The orthogonal hinge joint axes become orthogonal to each other at full extension of the truss and remain parallel at all times. When fully deployed, the basic single truss forms three planar trusses, of Warren pattern, integrally joined along two common chords, with an open face between two secondary chords.

In the basic form, the invention can be used as a beam or a mast in a wide variety of applications. As a beam, it can be supported or mounted at each end, or cantilever mounted. As a mast, it is base-mounted with guy cables as required. End bearing pads may be affixed to the ends of the chordal members and end struts to provide additional stability and strength when the truss is deployed. In an alternative embodiment of the basic single configuration, additional diagonals are added between the two secondary chords for additional strength and stability.

In a rectangular configuration, two single section trusses are connected at the joints at the end of the side diagonals, thereby providing greater strength and stability. Advantages include the ability to withstand transverse load reversal and, as a mast, no requirement for guy cables. End frames may be used on one or both ends as mounts.

In an alternative rectangular configuration, a telescoping transverse strut may be mounted along one long side of the truss. The side diagonals along that side may remain in place, or may be removed to reduce cost and weight. Flexible members or cables may also be added in place of the side diagonals, if removed.

Another exemplary embodiment is a curved configuration of the basic single truss and the rectangular truss configurations, where the chordal members are varied in length so that the longitudinal axis of the truss follows a prescribed curve.

Thus, the invention in its various embodiments possesses several favorable characteristics relative to those trusses cited above, including, but not limited to, (i) use of the new orthogonal hinge folding method to achieve synchronous, coordinated motion of all members during extension or retraction, (ii) greater stability, (iii) self formation, so that no dedicated auxiliary mechanisms or structures are required other than simple means to offset gravity and friction, if required, (iv) deployment along the truss longitudinal axis with a length extension ratio that can be, but does not have to be, more than 15 times the retracted length, (v) minimization of cost, weight, and complexity by the elimination of unnecessary truss members and use of alternative forms of truss chordal members, and (vi) adaptability to actuation methods that can vary from fully manual to fully automatic, depending on the application requirements. Applications for the invention include, but are not limited to, scaffolding, platforms and construction equipment, crane and equipment booms, towers and masts, vehicle frames, theater stage roofs and lighting equipment, stowable equipment mounts, shelters, space structures and space vehicle booms, and exhibition display frames.

BRIEF DESCRIPTION OF THE DRAWINGS

FIGS. 1A and 1B show the general configuration of one exemplary embodiment of the basic single deployable truss beam in the retracted and extended (deployed) states and with principal components and features identified.

FIGS. 2A, 2B and 2C show the end views of single truss framesets in the extended and retracted states with frame and hinge axis layout geometry.

FIGS. 7A through 7C show cross-sectional views of a rectangular truss in accordance with one exemplary embodiment of the present invention.

DESCRIPTION OF THE EXEMPLARY EMBODIMENTS

Figure 3A:
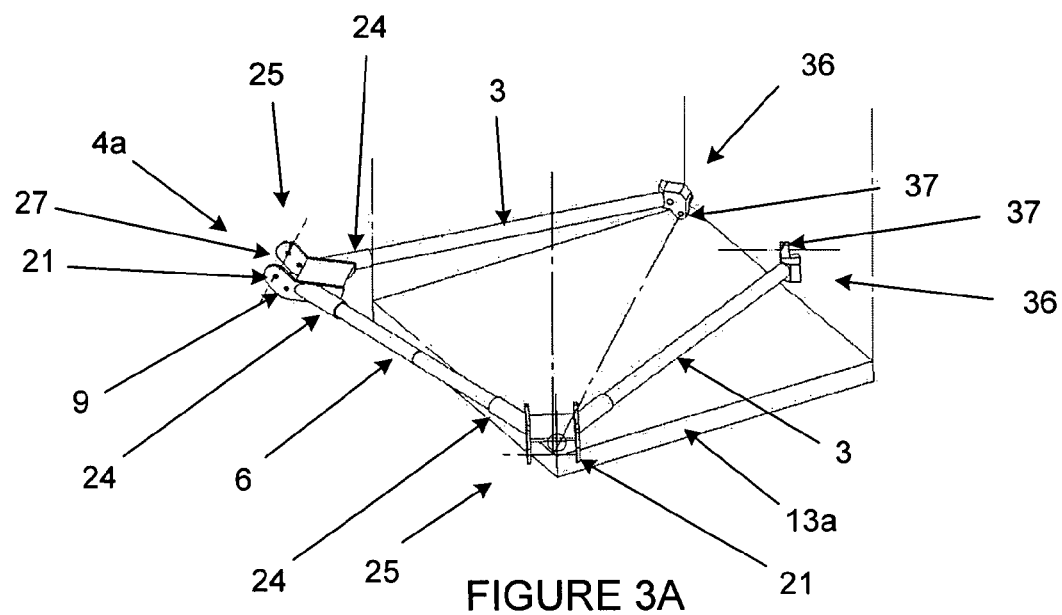
FIGS. 3A and 3B show the configuration of a single truss framebay in accordance with one exemplary embodiment of the present invention, and the method of mounting a major and minor joint of the truss to an end frame.

FIGS. 1A and 1B show the general configuration of a deployable single-section truss beam in the in the retracted and extended (deployed) states. Four longitudinal truss chords are formed by primary 1, and secondary 2 chordal members. As depicted in FIGS. 1A and 1B, the primary chordal members 1 are compression structures and the secondary chordal members 2 are tension structures, although the chordal members are not limited to this configuration. Compression chordal members may be rigid or hinged 1, while tension chordal members may be flexible, hinged or cables 2.

The primary chords 1 are laterally connected by base diagonal members 6. Each secondary chord 2 is laterally connected with the proximal primary chord 1 by side diagonal members 3. When deployed, as shown in FIG. 1A, the structure is equivalent to three planar trusses of Warren pattern with two common chords.

Primary orthogonal hinge joints 4 connect the ends of the primary chordal members 1 that form the primary chords and the respective side 3 and base 6 diagonal members. Secondary orthogonal hinge joints 7 connect the ends of the secondary chordal members 2 that form the secondary chords and the respective side diagonal members 3.

One end of the truss is connected to a truss end frame 13a at a primary orthogonal hinge joint 4 and a secondary orthogonal hinge joint 7. For greater strength and stability, the truss may also be attached to the end frame at two additional points through the use of a primary strut 14 and a secondary strut 15. A second end frame 13b may be connected to the opposite end of the truss, as shown in FIG. 1A, but is not required.

FIGS. 2A and 2B show the basic geometry of the diagonal members 3, 6 making up a truss frameset 5. A base diagonal member 6 connects at both ends to two side diagonal members 3 through two base joints 4a, which will ultimately form two primary orthogonal hinge joints 4. In a preferred embodiment, the base diagonal member 6 has a rotary joint 6a somewhere along its length, not necessarily at its center. The opposite ends of the side diagonal members 3 connect to other framesets and secondary chordal members through secondary orthogonal hinge joints 7a. The orthogonal hinge axes become orthogonal (90 degrees) to each other at full extension, and remain parallel at all times.

As shown in FIGS. 2B and 2C, the length between apexes of the frameset is the diagonal length "L" of the reference single truss having width "W." The side diagonals are also length "L" with angle "a" calculated from the reference single truss geometry. The lines opposite angles "a" are of length 1.414(W), equal to the truss diagonal. The primary orthogonal hinges 4 are at the corner apexes with their axes parallel to these lines. The secondary orthogonal hinges 7 are at the end of each side diagonal 3 with their axes parallel to the respective primary orthogonal hinge axes.

Figure 3B:
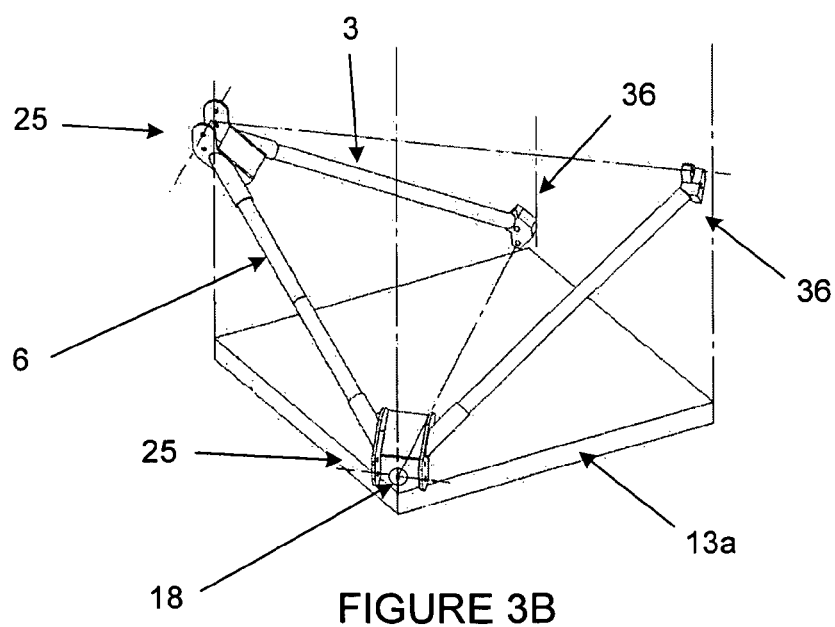
Figure 4A:
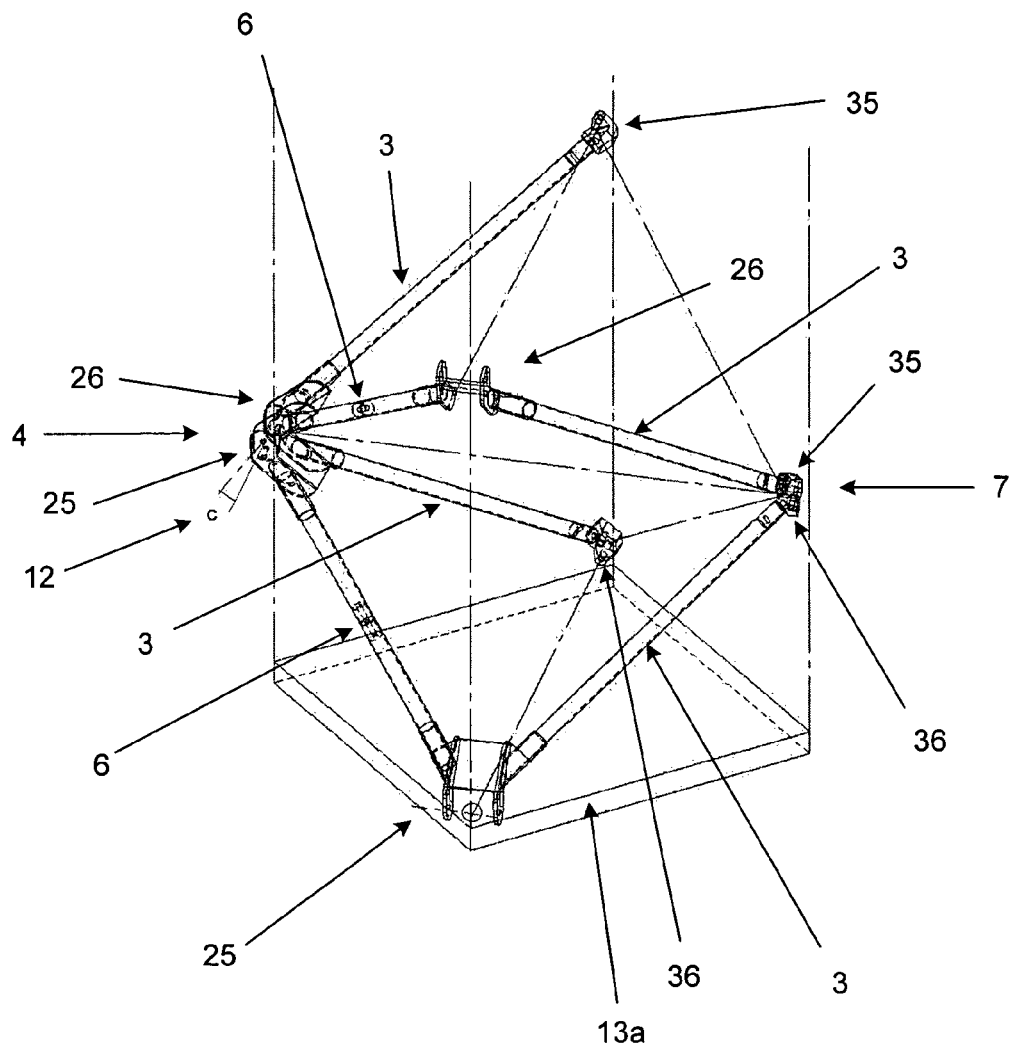
FIGS. 4A and 4B show the formation of a single truss framebay from two truss framesets and a primary and secondary chordal member in accordance with one exemplary embodiment of the present invention.
Figure 4B:
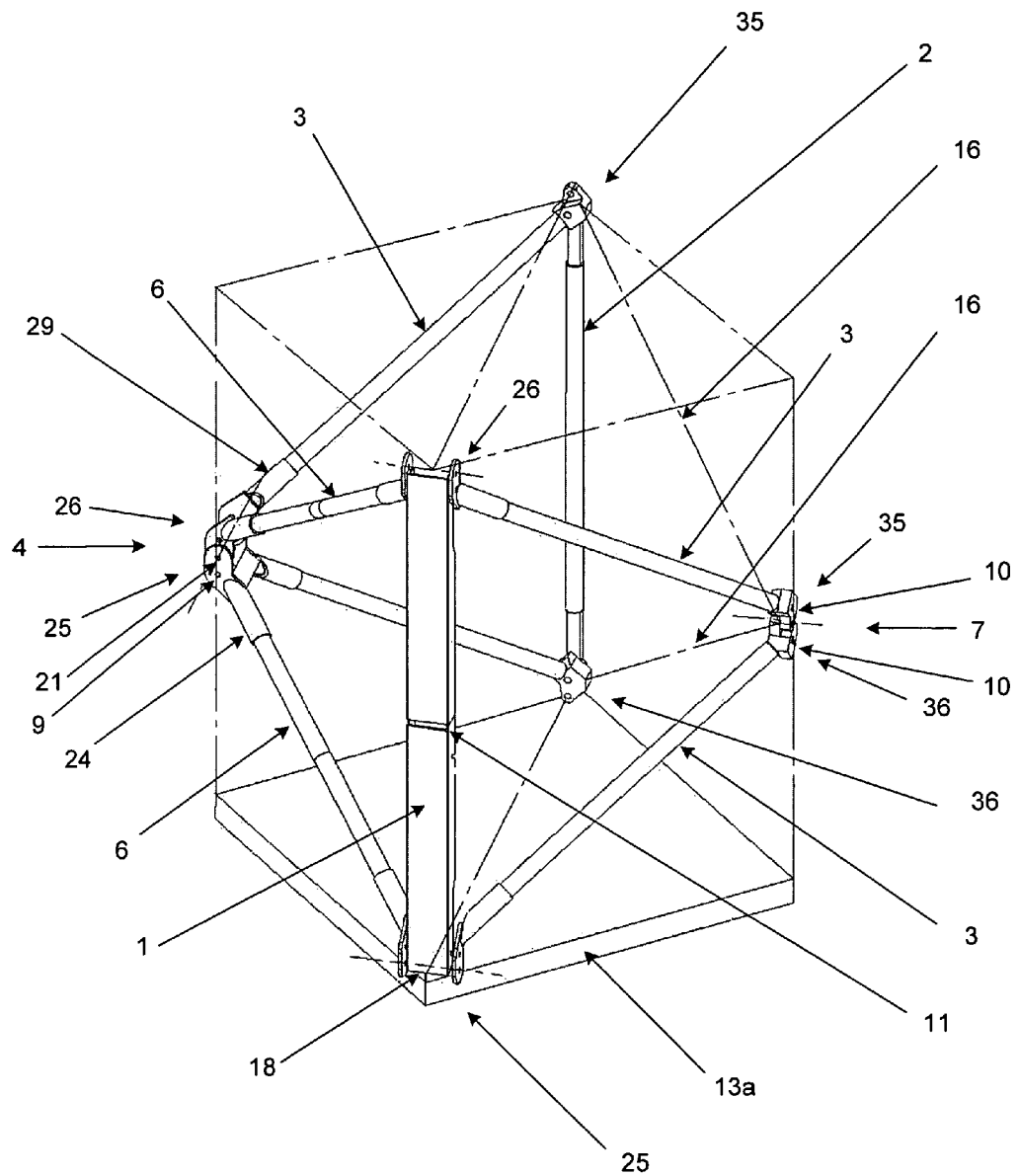

FIGS. 3A, 3B, 4A and 4B show how two U-shaped framesets 5 are connected together to form a truss frameset subassembly and, with the addition of chordal members, a truss framebay 8. A frameset subassembly is formed by connecting two mirror-image framesets 5 at one of their respective base joints 4a to form a major joint 4, and at the free ends of their opposing side diagonals to form a minor joint 7. A primary chordal member 1 is connected to the two free base joints 4a on the framesets, and a second chordal member 2 is connected to the two free ends of the two side diagonals 3 connected to the major joint, to form a framebay 8. Mirror-imaged framebays then are connected in sequence at their respective major and minor joints. In the preferred embodiment, the major joints are primary orthogonal hinge joints 4 and the minor joints are secondary orthogonal hinge joints 7. As seen in FIG. 4B, orthogonal hinge axes are always parallel and become orthogonal at full extension.

Through the use of the orthogonal hinge joints 4, 7, the expansion and retraction kinematics are such that a driven rotation of any joint, e.g. a diagonal rotary joint, results in a predictable motion of all other joints including the chordal members 1, 2 if hinged, as, for example, in a conventional "scissor" linkage. Chordal members that are center-hinged 11 move in a "z-fold" manner and at full retraction are parallel-nested.

When retracted, each frameset, having one rotary joint 6a in the preferred embodiment, nests parallel to its mirror image, connected through one primary 4 and one secondary orthogonal 7 hinge joint, thus representing two layers of truss diagonals and one truss framebay 8 as seen in FIG. 4B. These two layers also contain the associated folding hinged chordal members 1 and the flexible chordal members 2 in the preferred embodiment.

The primary and secondary orthogonal hinge joints 4, 7 are each assembled from male and female halves to form the primary structural joints of the extended truss as shown in FIGS. 3A, 3B, 4A, 4B, 5A, 5B, 6A and 6B. The primary orthogonal hinge joints 4 have hinge pin connections 9 for the primary chordal members 1. The secondary orthogonal hinge joints 7 in FIG. 6A have connecting pins 10 for the secondary chordal members 2 shown in this embodiment.

Figure 5A:
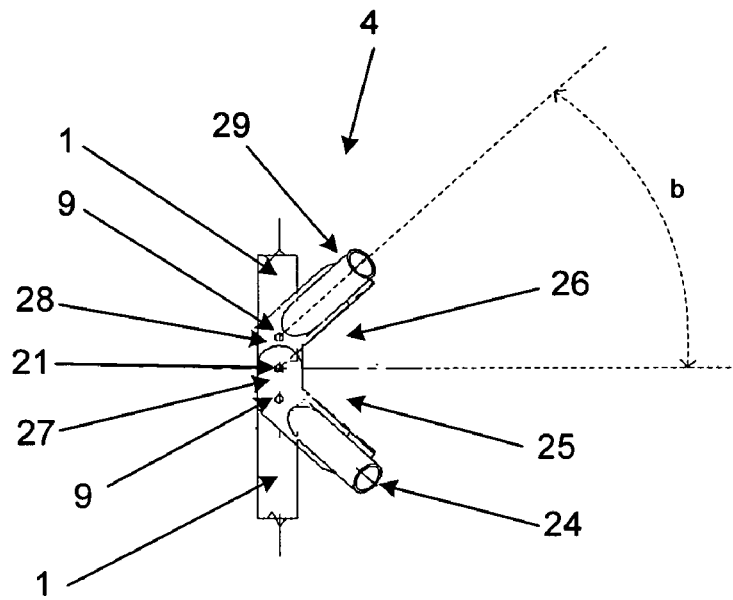
FIGS. 5A and 5B show views of the orthogonal hinge joint fittings and hinge fitting geometry of a primary orthogonal hinge joint.

FIGS. 5A, 5B, 6A, and 6B show side views of the primary 4 and secondary 7 orthogonal hinge joints and indicates their basic geometry. The primary orthogonal hinge joint 4 when retracted occupies "2P" (where "P" is the frame pitch) or the thickness of one bay, with the main hinge joint 21 axis centered and located in the hinge lugs 27, 28. Each half 25, 26 of the primary orthogonal hinge joint 4 receives two diagonals (one side 6 and one base 3), attached to the lugs 27, 28 (or equivalent part), as seen in FIGS. 2, 3 and 4. The diagonal mount angle is "a/2" degrees as seen in FIG. 2C. The lugs 27 also provide the hinge pin connections 9 for the primary chordal members 1, with axis location determined from angle "b" and distance "P", such that when extended (unfolded) the hinge pins are coplanar and lie on the chordal axis as shown in the "extended" view. The thickness available for the primary chordal members, if folded, is The secondary orthogonal hinge joints 7 receive and connect the side diagonals 3 as seen in FIG. 2A. The hinge axis is co-planar with the primary orthogonal hinge axis. The diagonal mount angle is "a/2" degrees as seen in FIG. 2C. As with the primary orthogonal hinge joints 4, the chordal member connection pin axes 10 as shown in FIG. 5A are located by angle "b" so that when unfolded the three hinge pins are coplanar and lie on the chordal axis.

Figure 5B:
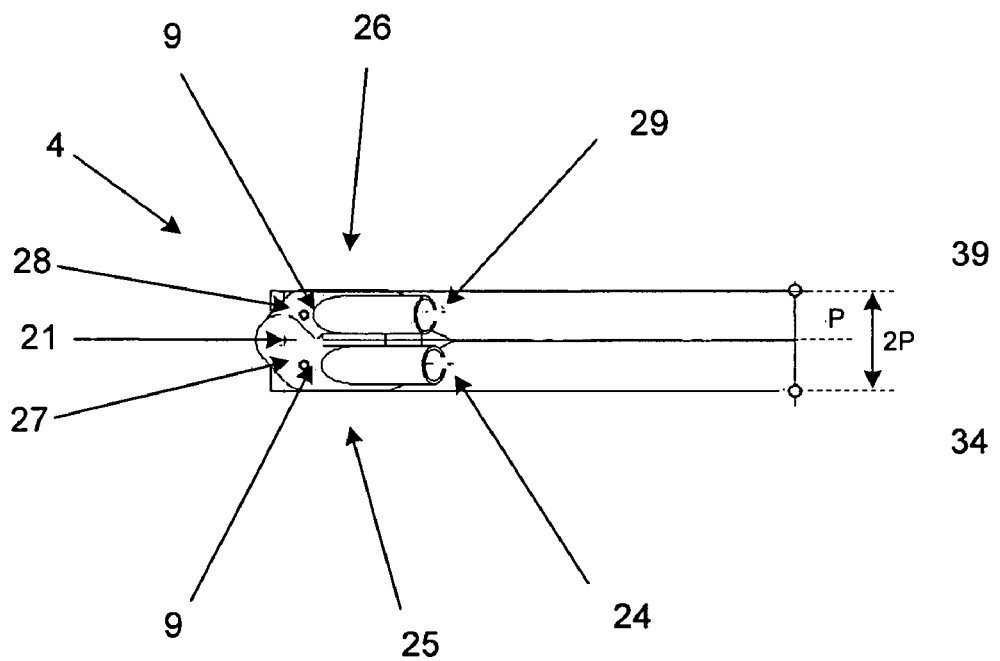

In one exemplary embodiment, as seen in FIGS. 5A and 5B, the primary orthogonal hinge joint 4 comprises a female half 25 with two ends, one end comprising two parallel lugs 27 with a sequence of matching holes 9, 21 in each lug for providing connecting points, and the other end comprising a pair of angled features 24 for connecting tubular, beam or rod structures, and a male half 26 with two ends, one end comprising two parallel lugs 28 with a sequence of matching holes 9, 21 in each lug, and the other end comprising a pair of angled features 29 for connecting tubular, beam or rod structures. The lugs 28 of the male half 26 are designed to fit within the two parallel lugs 27 of said female half 25 and be hingedly connected to said female half. As shown in FIGS. 5A and 5B, the hinge connection may comprise a main hinge pin inserted through a pair of matching holes 21 in the lugs 27, 28.

Figure 6A:
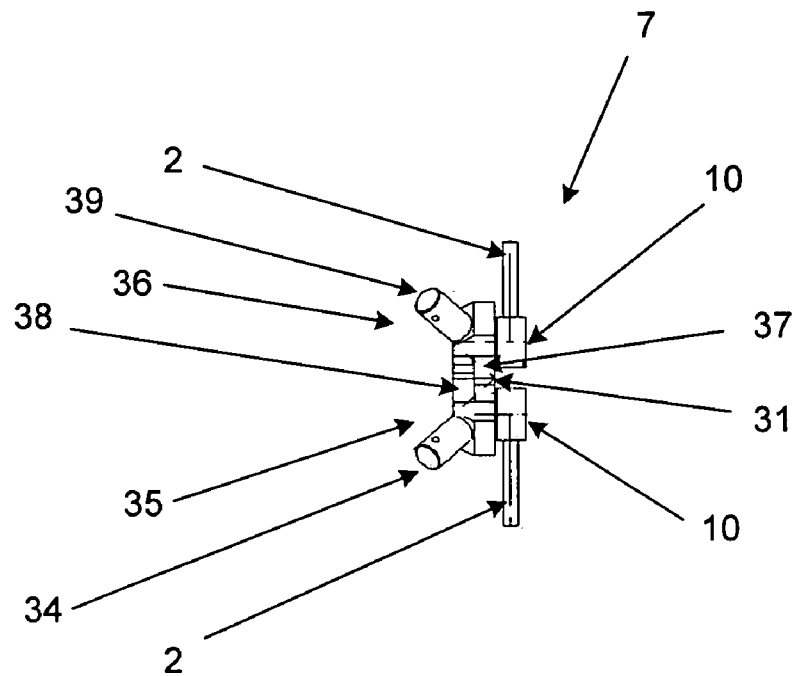
FIGS. 6A and 6B show views of the orthogonal hinge joint fittings and hinge fitting geometry of a secondary orthogonal hinge joint.
Figure 6B:
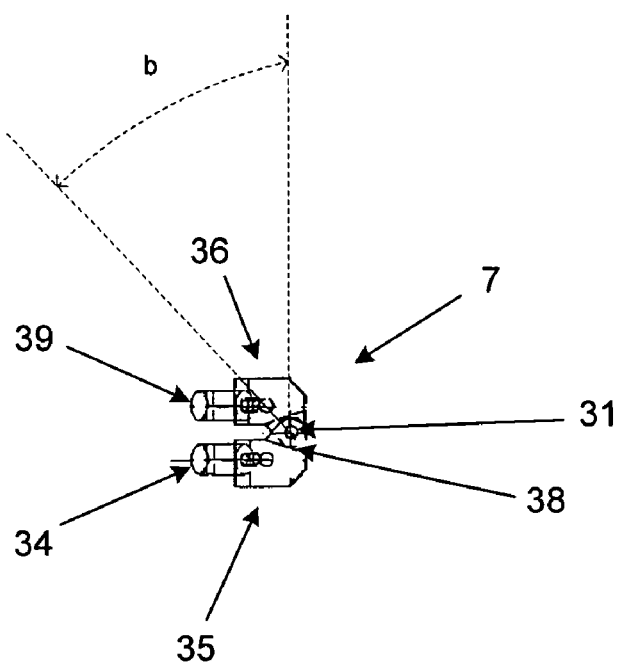

In another exemplary embodiment, as seen in FIGS. 6A and 6B, the secondary orthogonal hinge joint 7 comprises a female half 35 with two ends, one end comprising one offset 37 or two parallel lugs with a sequence of matching holes in each lug for providing connecting points, and the other end comprising a single angled feature 34 for connecting tubular, beam or rod structures, and a male half 36 with two ends, one end comprising a single lug 38 with a sequence of holes, and the other end comprising a single angled feature 39 for connecting tubular, beam or rod structures. In one embodiment, the lug 38 of the male half 36 is designed to fit within the two parallel lugs of said female half 35 and be hingedly connected to said female half. The hinge connection may comprise a main hinge pin inserted through a pair of matching holes 31 in the lugs. In an alternative embodiment, as shown in FIG. 6A, the female half 35 may have a single offset lug 37 designed to fit a matching offset lug 38 on the male half 36.

Kinematically, the truss requires a minimum of only one force or torque to cause continuous, synchronous motion (synchronous meaning all parts are kinematically coupled). Although hinged chordal members, when used, can lock passively (by springs or the equivalent), forces are required to cause unlocking and initial rotation of the "knee" joints 11 prior to retraction of the full assembly, as seen in FIG. 4B. For fully automatic or semi-automatic operation, this implies the need for actuators whose selection will be dependent on the specific requirements of a given truss application.

FIGS. 1, 3 and 4 depict the preferred method for connecting the truss ends to end mount frames 13a, 13b such that the truss chords are perpendicular to the end mount frames at full deployment, and parallel to the end mount frames when retracted. This is achieved by hinging the primary 4 and secondary 7 orthogonal hinge joints to the end mount frames 13a, 13b at diagonal corners as seen in FIG. 3A, and using short primary and secondary struts 14, 15 as seen in FIG. 1 to connect the other two diagonal corners. In the preferred embodiment, the primary strut 14 is similar to but about the half the length of the fill-length primary chordal member 1, but the two halves of the strut are of unequal length in order to obtain the proper folding geometry. Alternatively, the primary strut 14 can be non-folding by having one end slide in a track on the respective end frame approximately parallel to the truss section diagonal line, with locking provision at full extension. As shown in FIG. 3B, one primary orthogonal hinge joint half requires a vertical axis pivot fitting 18 to accommodate the required rotation as seen in FIG. 2.

With reference to FIG. 4B, the open face of the truss can be fitted with diagonal members, including but not limited to telescoping or hinged diagonals, in an alternative embodiment (see two diagonal phantom lines 16 connecting the secondary orthogonal hinge joints 7). Another alternative embodiment relative to the truss chords is to manually install simple compression chordal members after the truss is unfolded. Use of compression chordal members for all four chords permits bi-directional beam moment loading, if needed. In a further embodiment, end bearing pads may be affixed to the ends of the chordal members and primary or secondary struts as appropriate, to provide additional stability and strength when the truss is deployed.

In a number of alternative embodiments, derivative trusses can be created by lateral connection of identical basic single trusses to form rectangular or diamond shapes.

FIGS. 7A through 7C and FIG. 9 show a rectangular truss configuration in which two single truss mirror images (i.e., two U-shaped trusses) 5 are joined at the ends of their respective side diagonal members 3 (i.e., at the secondary orthogonal hinge joints 7a) to create a rectangular frameset 50. When fully extended, the side diagonals 3 and the base diagonals 6 meet at substantially right angles. In this configuration, the secondary chordal members are eliminated, and the side diagonal members 3 become cross-bracing members. Thus, the two primary chords 1 of the component single trusses become the four chords of the rectangular truss.

Figure 8:
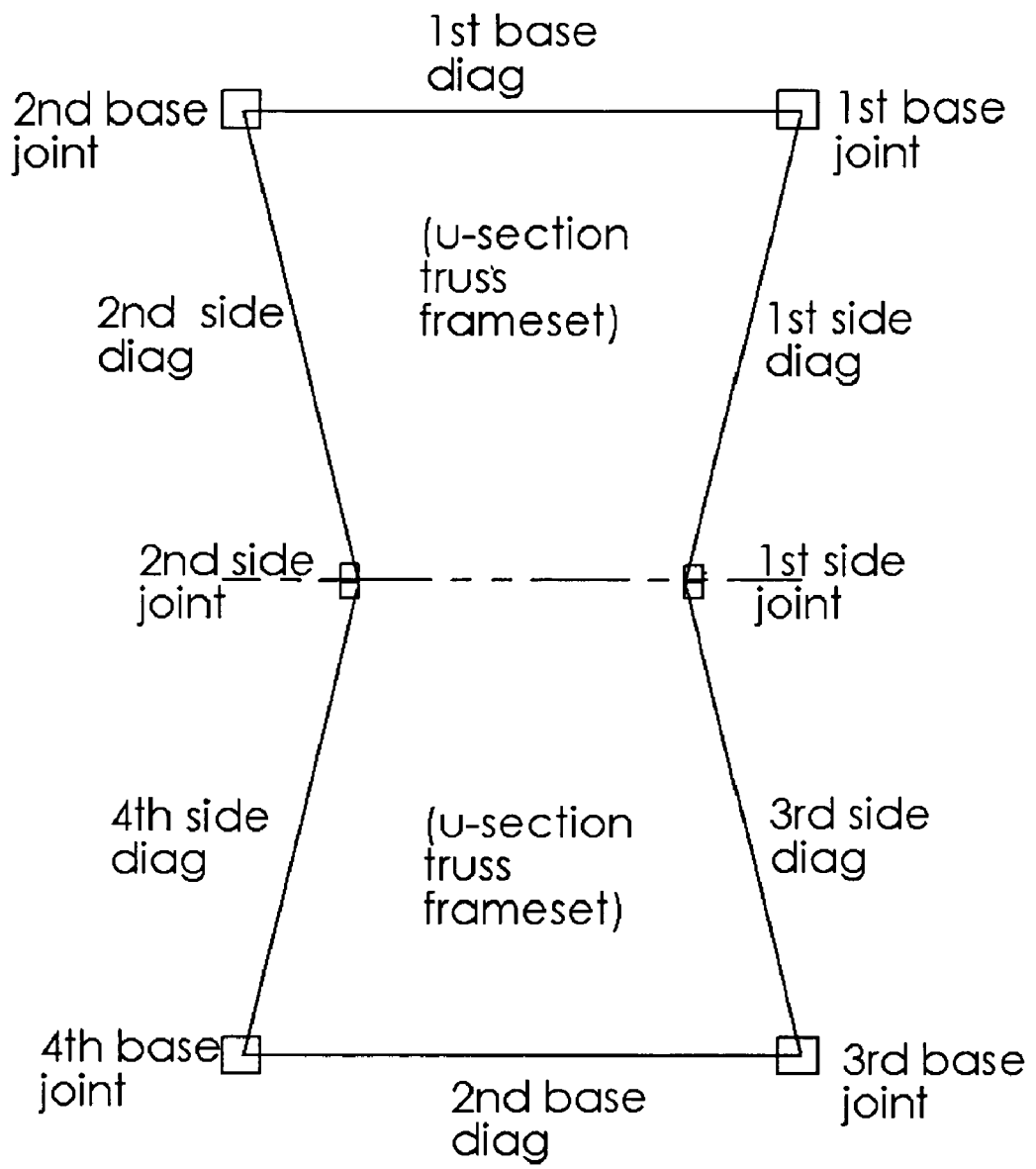
FIG. 8 shows a diagram of a rectangular truss frameset in accordance with one exemplary embodiment of the present invention.

The geometry of a rectangular truss frameset can be seen in FIG. 8. Each frameset has opposing first and second base diagonal members, with two side diagonal members along the long side of the rectangle connecting the respective ends of the base diagonals. The first base diagonal member is connected to ends of the two side diagonals at first and second base joints 4a, while the second base diagonal member is connected to the ends of the other two side diagonals at third and fourth base joints. The side diagonals along each side of the rectangular truss are connected at their remaining ends at first and second side joints 51.

Figure 9:
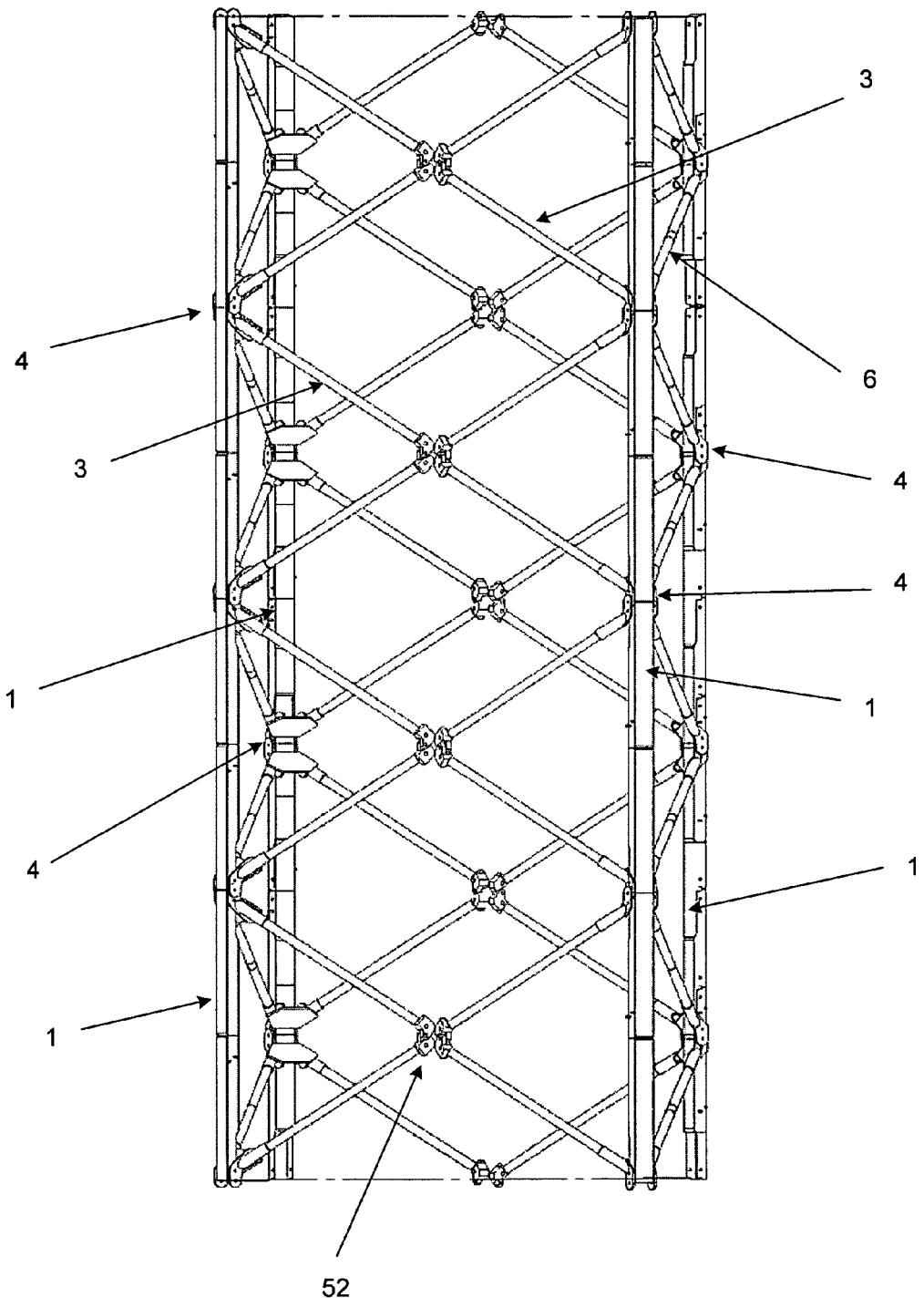
FIG. 9 shows a top perspective view of a rectangular truss in accordance with one exemplary embodiment of the present invention.

As seen in FIG. 9, a rectangular truss may be constructed by connecting a plurality of rectangular truss framesets 50 together. Framesets are connected directly at certain base joints 4a and side joints 51, and also by connecting primary chord members 1 between respective base joints. The connection of two base joints 4a forms a major joint 4. The connection of two side joints 51 form a minor joint 52.

Figure 14:
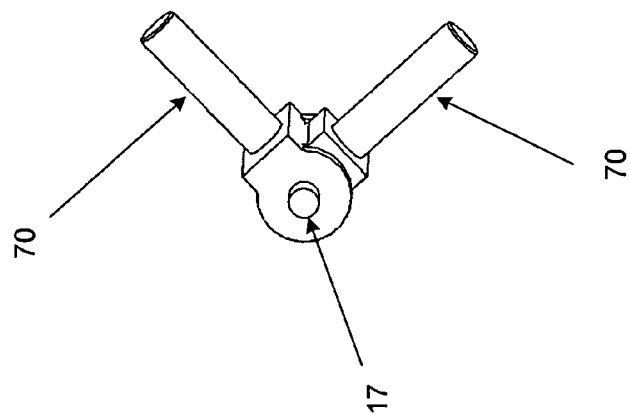
FIG. 14 shows a view of a clevis hinge fitting in accordance with one exemplary embodiment of the present invention.
Figure 13:
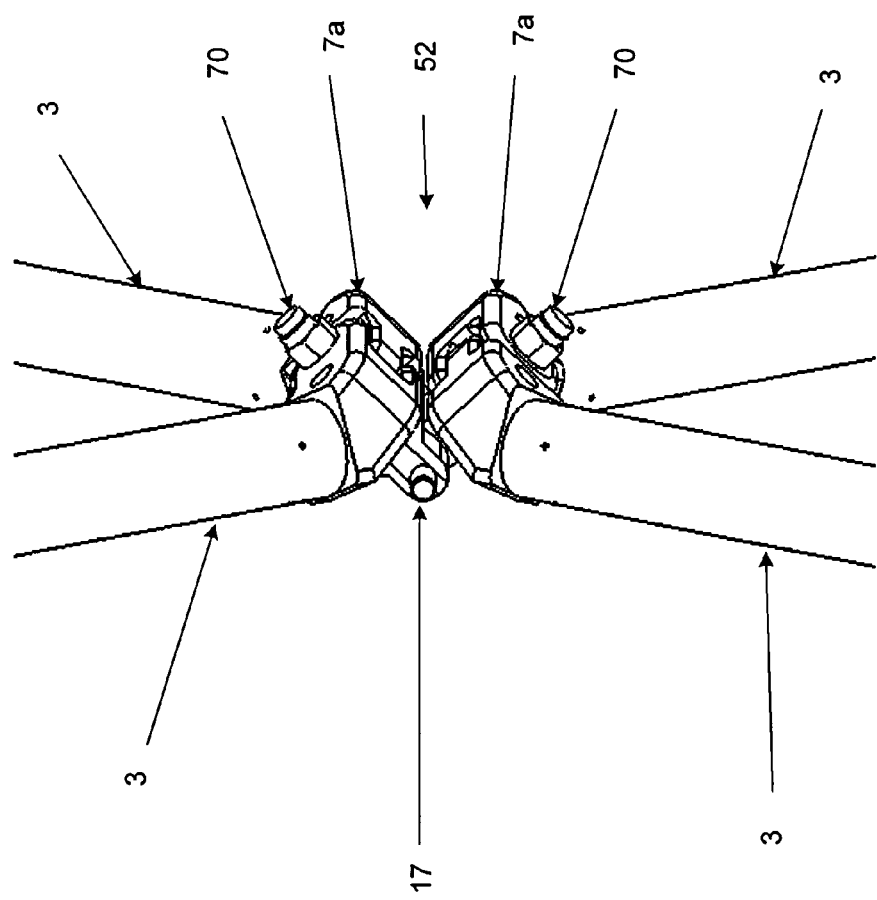
FIG. 13 shows a view of a rectangular truss minor joint in accordance with one exemplary embodiment of the present invention.

As seen in FIG. 13, connection of the respective side diagonal members 3 of a frameset to form a side joint 51, and in the rectangular truss, the connection of secondary orthogonal hinge joints 7a to form a minor joint 52, is accomplished with clevis end hinge fittings 17 or the equivalent. The clevis hinge fitting connects the secondary orthogonal hinge joint hinge pins 70 and permit a small rotation. FIG. 14 shows a variation on a clevis hinge fitting configuration. In one exemplary embodiment, the small rotation may be from 6 to 8 degrees. In a collapsed state, the framesets of the truss nest together.

Figure 7C:
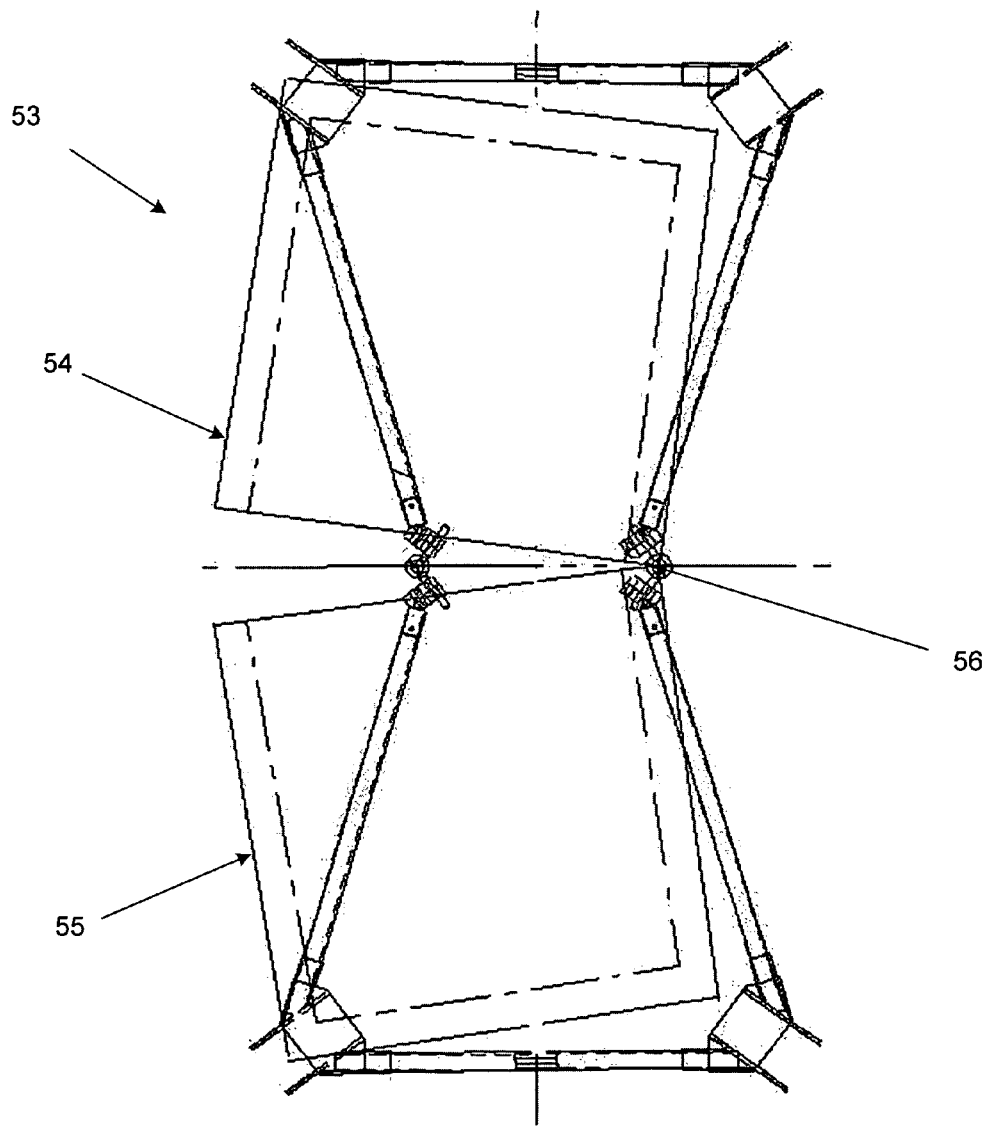

As shown in FIG. 7C, one or more end frames 53 can be placed at one or both ends of the rectangular truss. In one exemplary embodiment, an end frame 53 comprises two square components 54, 55, hinged together at a corresponding corner 56. The axis of this corner hinge 56 is collinear with the hinge fittings 17. At full extension of the truss, the two square components 54, 55 have rotated towards each other to meet along one side, and may be latched together to form the load interface (end) structure.

Figure 10A:
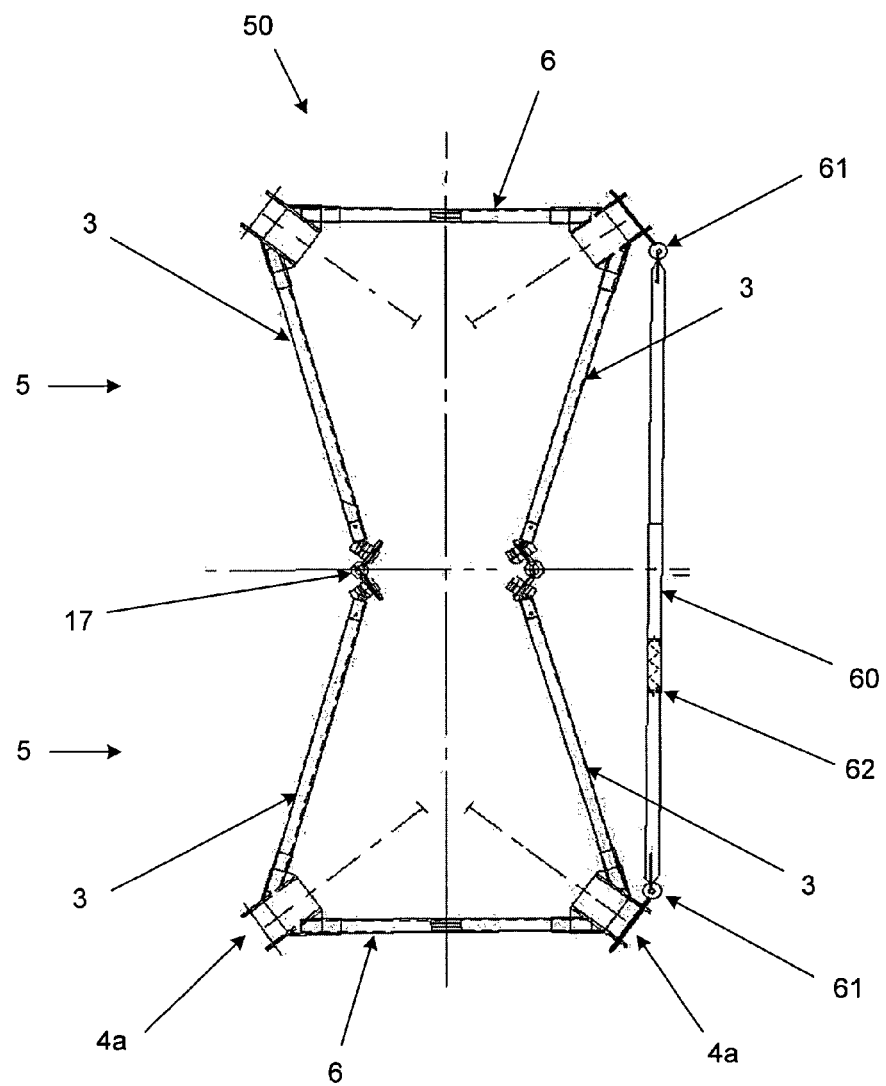
FIGS. 10A, 10B, and 10C shows views of a rectangular truss with transverse struts in accordance with one exemplary embodiment of the present invention.
Figure 10B:
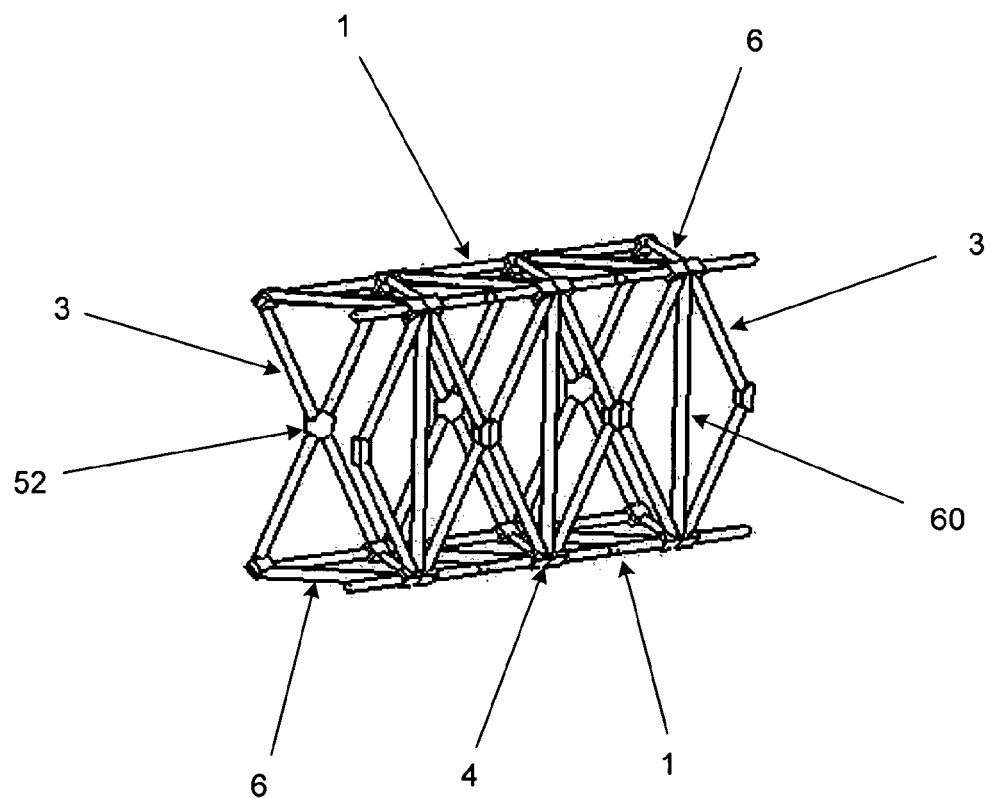

In yet another exemplary embodiment, as shown in FIG. 10A, the opposing major joints on one long (or wide) face of the truss may be connected with one or more telescoping transverse struts 60. The struts 60 may be connected at each end to the main hinge pins of the primary joint 4 with simple clevis hinges 61 similar to the clevis hinge fittings 17 at the side joints. In another embodiment, the struts 60 may incorporate a linear actuator or spring 62 to apply equal and opposite forces to the primary joints 4 to aid in truss deployment and/or counterbalancing. The linear actuator or spring 62 may be located anywhere along or adjacent to a strut 60, including at either end, and may be internal or external.

Figure 10C:
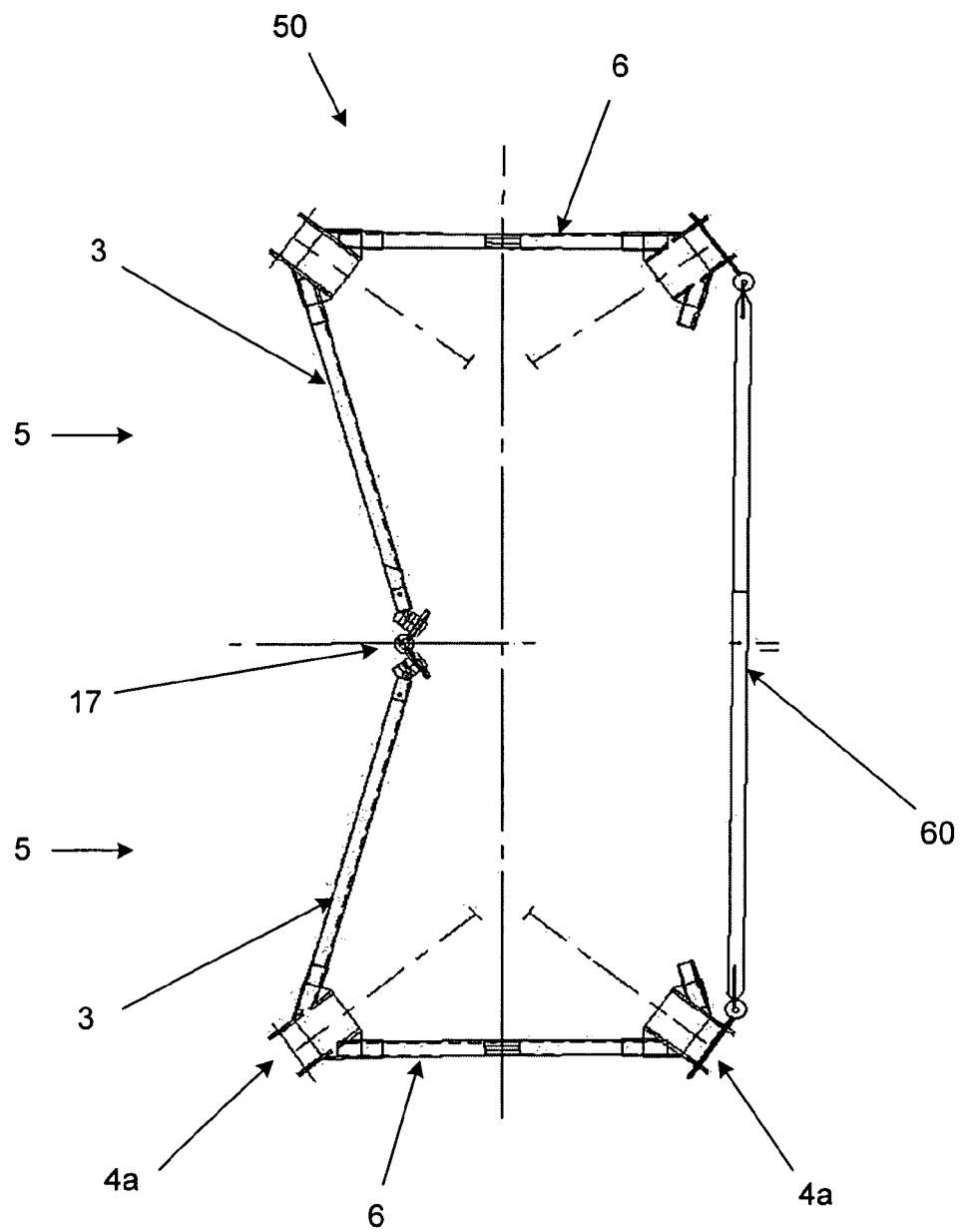
Figure 12:
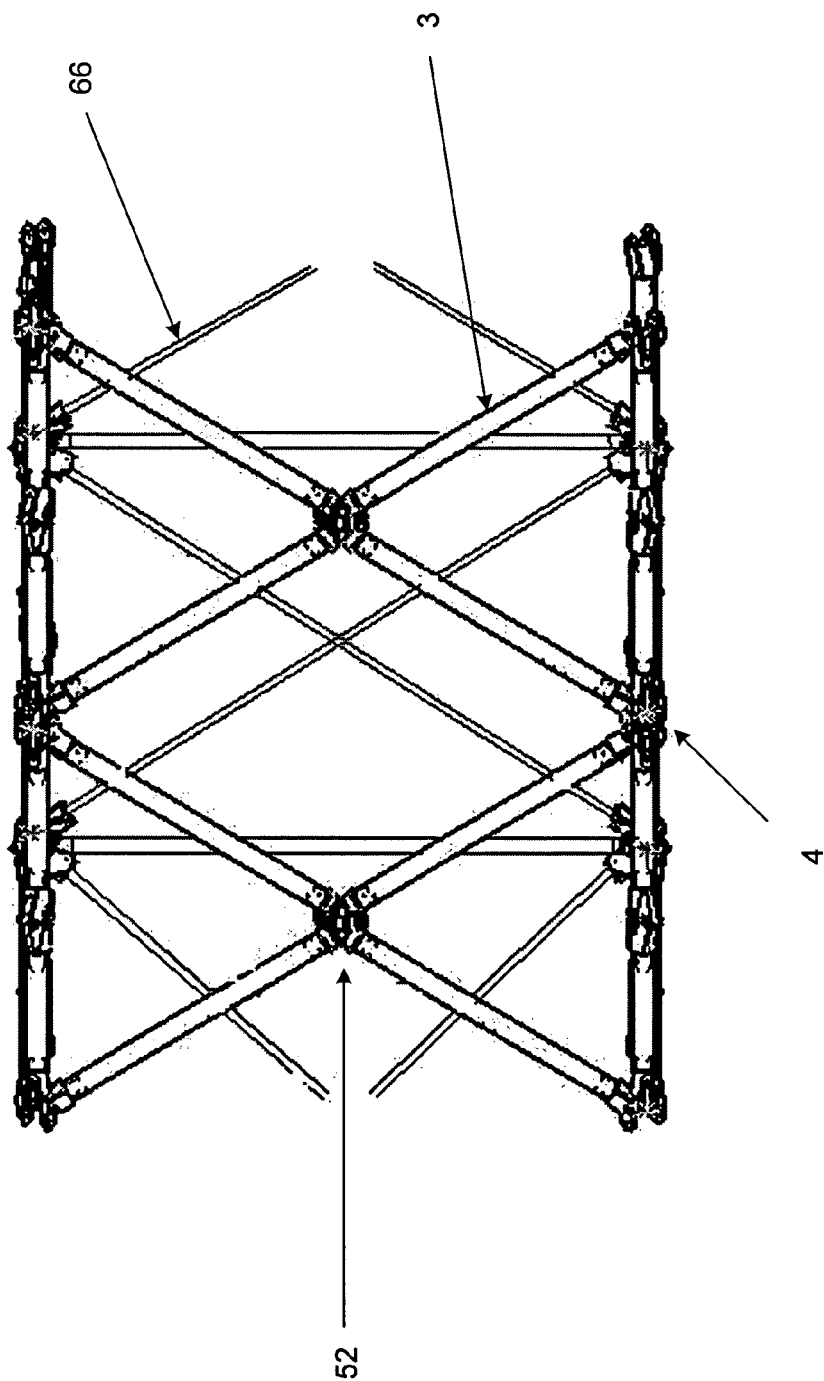
FIG. 12 shows a view of a rectangular truss with crossed flexible members in accordance with one exemplary embodiment of the present invention.

In an alternative exemplary embodiment of the rectangular truss, the adjoining side diagonal members 3 are removed from the one side of the rectangular truss frameset to create an open face. This configuration is designed to lower cost and weight. Telescoping transverse struts 60 may be added to this side for strength and stability, as seen in FIG. 10C. In addition, or in the alternative, flexible members 66, such as cables, may be connected between opposing major joints. These flexible members 66 fold passively when the truss is being collapsed. These flexible members 66 may be attached in a variety of configurations; one exemplary crossed configuration is shown in FIG. 12.

Figure 11:
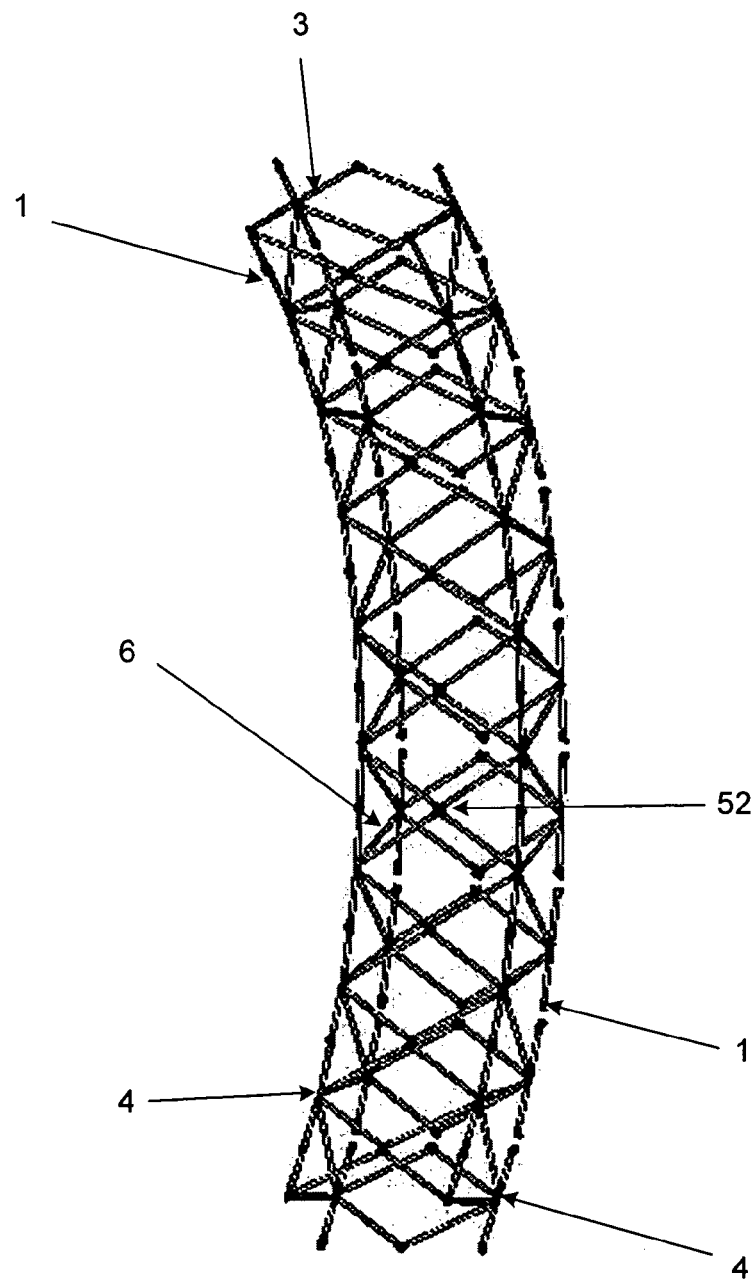
FIG. 11 shows a view of a curved rectangular truss in accordance with one exemplary embodiment of the present invention.

The basic single truss and the rectangular truss may also be curved along the truss longitudinal axis, as seen in FIG. 11. This may be accomplished by varying the length of the appropriate chordal members. The primary orthogonal hinge joints 4 may accommodate an in-plane castor angle 12 of a calculated magnitude "c". This results in an angle between truss framebays.

For all embodiments, if gravity loading is not present or if the truss frames are supported by rollers or equivalent, a preferred method of deployment is application of an axial force at the end frame to both extend and retract. The chordal members, if hinged, are spring locked at full extension. To begin the retraction process, any hinged chordal members are unlocked and given an initial rotation as mentioned above. This is done either manually or by an actuation mechanism. The actuation components can be located on the chordal members or centrally located using pull cables.

For extension/retraction on a level or sloping surface, a preferred support method is the use of low-friction caster wheels attached to the primary orthogonal hinge joints to support the truss frames. When no support surface or floor is available, the truss can be supported by various simple cable/winch arrangements during extension and retraction. For long trusses, a vertical center hinge can be provided so that the two sections can be extended side-by-side until locked, then the end section rotated 180 degrees and locked.

Even though specific embodiments of this invention have been described, they are not to be taken as exhaustive. There are several variations that will be apparent to those skilled in the art, including multiple combinations of the basic single-section truss beyond the dual and curved configurations described herein.

I claim:

1. A deployable truss with proximal and distal ends, comprising:
   a. a plurality of framesets, each frameset having a first and second base diagonal member and a first, second, third and fourth side diagonal member, said base and side diagonal members each having a first and second end, said first base diagonal member being connected at its first end adjacent to the first end of the first side diagonal member at a first base joint, said first base diagonal member further being connected at its second end adjacent to the first end of the second side diagonal member at a second base joint, said second base diagonal member being connected at its first end adjacent to the first end of the third side diagonal member at a third base joint, said second base diagonal member further being connected at its second end adjacent to the first end of the fourth side diagonal member at a fourth base joint, wherein said first side diagonal member is further connected at its second end adjacent to the second end of the third side diagonal member at a first side joint, and further wherein said second side diagonal member is further connected at its second end adjacent to the second end of the fourth side diagonal member at a second side joint;
   b. a plurality of framebay subassemblies, each framebay subassembly comprising a first and second frameset connected to each other at a first and second major joint and a first minor joint, said first major joint comprising the connection of the first base joint of the first frameset to the first base joint of the second frameset, said second major joint comprising the connection of the third base joint of the first frameset to the third base joint of the second frameset, and said first minor joint comprising the connection of the second side joint of the first frameset to the second side joint of the second frameset; and
   c. a plurality of framebays, each framebay comprising a framebay subassembly, a first primary chord member connected at its ends to the second base joints of the first and second framesets comprising the framebay subassembly to form third and fourth major joints, and a second primary chordal member connected at its ends to the fourth base joints of the first and second framesets comprising the framebay subassembly to form fifth and sixth major joints, wherein adjacent framebays are connected to each other at their respective third, fourth, fifth and sixth major joints and at the first side joints of their respective first and second framesets, and further wherein adjacent framebays are connected by means of a third primary chordal member connected at its ends to the respective first major joints of said adjacent framebays and by means of a fourth primary chordal member connected at its ends to the respective second major joints of said adjacent framebays;
   d. wherein said truss, when extended, forms a rectangle in cross-section, with four primary chords at the corners of the rectangle formed by primary chordal members extending through the corners of the rectangle.

2. The deployable truss of claim 1, further wherein said major joints comprise a female half and a male halt said female half comprising two ends, a first end comprising two parallel lugs with a sequence of one or more matching holes in each lug for providing a hinged connection to the male half, and a second end comprising a pair of angled connection features for connecting diagonal members, and said male half comprising two ends, a first end comprising two parallel lugs with a sequence of one or more matching holes in each lug for providing a hinged connection to the female half, and a second end comprising a pair of angled connection features for connecting diagonal members.

3. The deployable truss of claim 1, further wherein said minor joints comprise two secondary orthogonal joints connected by a clevis fitting, each secondary joint comprising a female half and a male half, said female half comprising two ends, a first end comprising one or more lugs with a sequence of one or more matching holes in each lug for providing a hinged connection to the second half, and a second end comprising a single angled fitting for rigidly connecting a diagonal member, and said male half comprising two ends, a first end comprising one or more lugs with a sequence of one or more matching holes in each lug for providing a hinged connection to the female half, and a second end comprising a single angled fitting for rigidly connecting a diagonal member.

4. The deployable truss of claim 1, further wherein no diagonal, chordal or other structural members extend between primary chords on diametrically opposing corners of the rectangle.

5. The deployable truss of claim 1, further wherein the second ends of the side diagonals are hingedly connected at respective side joints.

6. The deployable truss of claim 3, further wherein the clevis fitting hingedly connects respective hinge pins of the respective secondary orthogonal joints.

7. The deployable truss of claim 1, wherein said primary chord members further comprise a centrally-hinged folding member that locks at full extension of the truss, a fixed rigid member connected after full extension of the truss, or a structure adapted to provide compressive strength.

8. The deployable truss of claim 1, wherein said primary chord members further comprise a flexible member, a centrally-hinged folding member, a cable, or a structure adapted to provide tensile strength.

9. The deployable truss of claim 1, further wherein said base diagonal members are adapted to be selectively rotated relative to their connections or are rotatably connected to said major joints.

10. The deployable truss of claim 1, further wherein said base diagonal members comprise two rigid portions rotatably connected.

11. The deployable truss of claim 1, further wherein respective framesets are adapted to collapse and expand in a coordinated, synchronous manner through action of the major joints wherein the axis of the hinge connections of said major joints remain orthogonal to the truss longitudinal axis.

12. The deployable truss of claim 1, further comprising a plurality of telescoping transverse strut members, each strut member connected at its ends to the first major joint and second major joint of a respective framebay.

13. The deployable truss of claim 12, further wherein one or more of said strut members comprises a linear actuator or spring.

14. The deployable truss of claim 1, further wherein the length of one or more pairs of adjacent primary chordal members on one side of the truss varies from the length of the opposing pairs of adjacent primary chordal members so that the truss is curved along its longitudinal axis in whole or in part.

15. The deployable truss of claim 1, further comprising
  a. an end frame assembly connected to the framebay adjacent to one of said proximal and distal ends at one of the respective third or fourth major joints and at one of the respective fifth and sixth major joints of said framebay;
  b. a first primary strut with two ends, connected at one end adjacent to said end frame and at the other end adjacent to the first major joint of the framebay adjacent to one of said proximal and distal ends; and
  c. a second primary strut with two ends, connected at one end adjacent to said end frame and at the other end adjacent to the second major joint of the framebay adjacent to one of said proximal and distal ends.

16. The deployable truss of claim 15, further wherein said end frame assembly comprises a first component and a second component, said first and second components comprising structures of substantially equal size, hingedly or pivotally connected at a common corner, wherein said first and second components mate along a common side when said truss is fully deployed, and pivot open around the common corner when said truss is being retracted or is fully retracted.

17. The deployable truss of claim 15, further comprising
  a. a second end frame assembly connected to the framebay adjacent to the other of said proximal and distal ends at one of the respective third or fourth major joints and at one of the respective fifth and sixth major joints of said framebay;
  b. an additional first primary strut with two ends, connected at one end adjacent to said end frame and at the other end adjacent to the first major joint of the framebay adjacent to one of said proximal and distal ends; and
  c. an additional second primary strut with two ends, connected at one end adjacent to said end frame and at the other end adjacent to the second major joint of the framebay adjacent to one of said proximal and distal ends.

18. The deployable truss of claim 15, further wherein the connection between a major joint and the respective end frame assembly comprises a two-axis pivot fitting that permits rotational movement of the joint during deployment of the truss.

* * * * *